Oct. 12, 1937.   G. L. MOREHEAD   2,095,394
FLOATING SKIMMER
Filed Aug. 6, 1935   3 Sheets-Sheet 3

Inventor
George L. Morehead
by Parker & Carter
Attorneys.

Patented Oct. 12, 1937

2,095,394

UNITED STATES PATENT OFFICE 2,095,394

FLOATING SKIMMER

George L. Morehead, Philadelphia, Pa., assignor to Link-Belt Company, Chicago, Ill., a corporation of Illinois Application August 6, 1935, Serial No. 34,945

16 Claims. (Cl. 210—3)

This invention relates to material handling and separation and in the particular form illustrated herewith is adapted for use as a skimmer in the treatment of sewage although it is not limited to that use.

The invention has for one object to provide means for removing scum or other material floating upon or near the upper surface of a body of liquid within a tank. Another object of the invention is to provide means for removing the scum and for collecting the sludge by an apparatus which leaves the center of the tank free and unobstructed. A further object is to provide a floating skimmer in which the skimming mechanism is wholly or in part floated upon the surface of the liquid within the tank.

Other objects will appear from time to time in the specification and claims.

The invention is illustrated more or less diagrammatically in the accompanying drawings, wherein:—

Like parts are designated by like characters throughout the specification and drawings.

Figure 1:
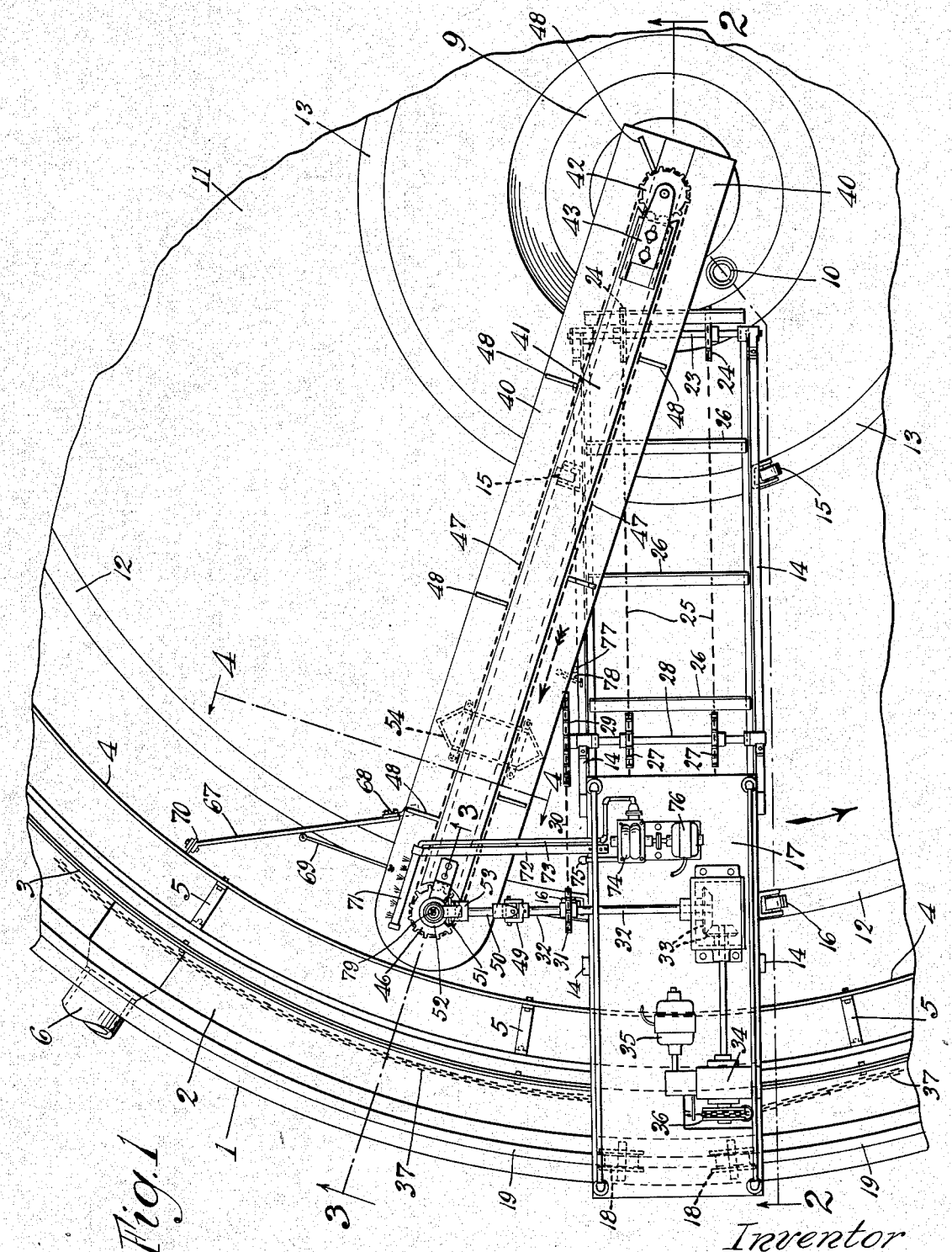
Figure 1 is a partial plan view of a tank with the conveying and skimming means in position.

In the form shown herewith the apparatus comprises a circular tank, means for introducing liquid to it and for withdrawing liquid from it; means for permitting sludge to settle out of the liquid and for moving the sludge to a central discharge point and for discharging it therefrom. It includes also means for sweeping scum from the surface of the liquid and for removing it therefrom. It is to be understood that the invention is not to be limited to a tank of any particular shape and while a skimmer or scum remover is shown, together with a sludge scraper or conveyor, either might be omitted and the other used alone, although normally both will be present.

The tank is formed of a wall 1 having an overflow trough 2 formed about its upper edge. The overflow trough is bounded on its inner edge by an adjustable weir 3 which may be adjusted to insure an even flow of liquid over its upper edge. A scum baffle 4 is preferably supported on supports or bracket members 5 about the interior of the tank and conforms in shape to the tank. It extends through a zone both above and below the surface of the liquid. 6 is a discharge conduit or connection from the overflow trough 2.

In the bottom of the tank, preferably centrally located, is provided an influence discharge 7, which may be of any desired shape. It is connected to the influent conduit 8 and through it influent is discharged into the tank. About the influent discharge 7 is a sludge trough 9 which may be annular as here shown and from which an outlet connection 10 leads. Sludge may be removed through this outlet connection. 11 is the floor or bottom of the tank. In it are positioned tracks 12 and 13, which extend about the tank and conform in shape to it. As here shown, since the tank is circular, the tracks are concentric with it.

A material conveying assembly is arranged to move as a unit about the tank. In the present case since the tank is circular it swings about the tank supported wholly or in part upon the tracks 12 and 13. The conveying assembly as shown comprises the supporting structure formed of members 14 which may carry pairs of rollers 15, 15 and 16, 16 in its bottom. These rollers run, respectively, upon the tracks 13 and 12. At its upper ends the supporting structure 14 joins a top bridge member or structure 17 which carries guide rollers 18 which rest upon a track 19 positioned with respect to the center of the tank preferably upon the wall 1 and extending about the tank. Fastened to the bottom of the supporting structure 14 is a sludge plow 20 which extends substantially from the wall 1 to the influent discharge 7 of the tank overlying the sludge trough 9 so that as the conveying assembly swings about the tank the entire bottom is swept by the plow, which may be in contact with the bottom and vertical surfaces adjacent the floor or may merely extend close to them.

Positioned adjacent the outer end of the supporting structure and near its bottom is a shaft 21 supported in suitable bearings and carrying sprockets 22. A similar shaft 23 is positioned adjacent the inner end of the conveying assembly and carries sprockets 24. Endless chains 25 engage the sprockets 22 and 24 and carry flights 26. The chains extend upwardly to engage driven sprockets 27 on a shaft 28, which, in the form here shown, is positioned above the liquid level. The shaft 28 also carries a driving sprocket 29 which is driven by means of a chain 30 which itself engages a sprocket 31 on a shaft 32 driven through beveled gearing 33 from a reduction gear 34 which is itself driven by an electric motor 35. A pocketed wheel 36 driven also by the reduction gearing 34 engages an endless chain 37, which lies in the overflow trough 2 and passes upwardly about a roller or sheave 38 carried in the lower end of a hollow arm 39. By this means when the pocketed wheel rotates the conveying assembly pulls itself about the tank, using the chain as a traction means.

Figure 2:
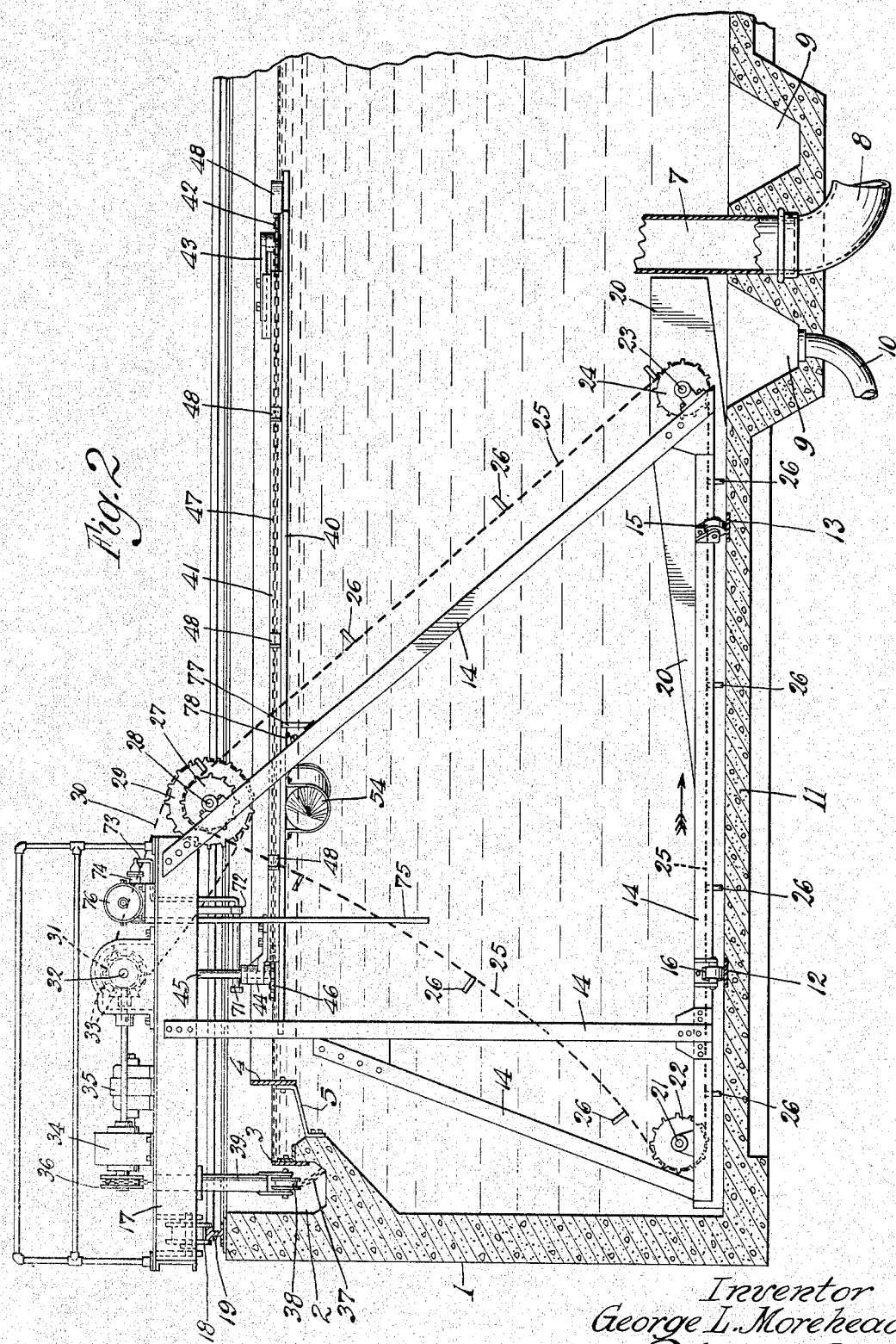
Figure 2 is a transverse, generally vertical section, taken at line 2—2 of Figure 1.
Figure 3:
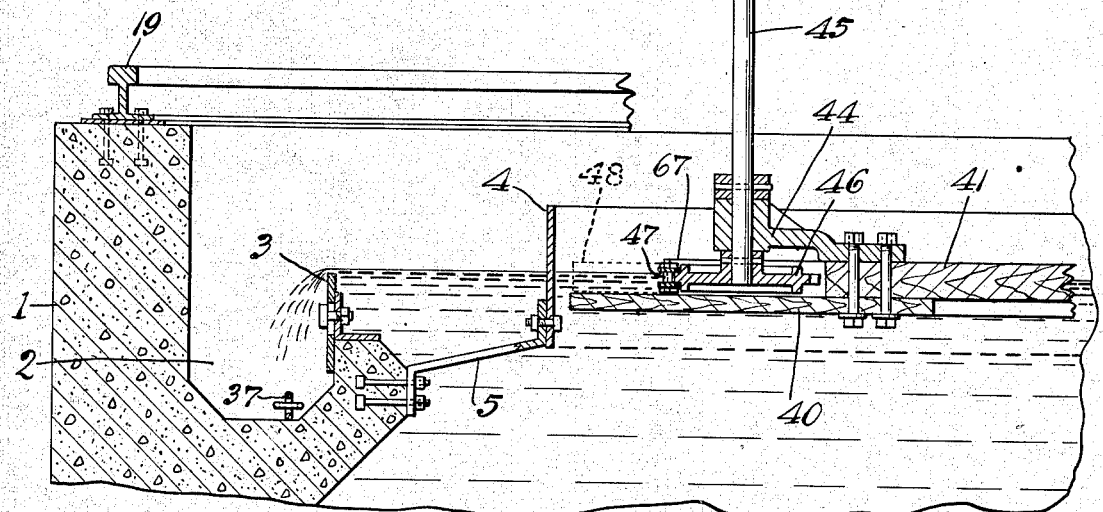
Figure 3 is a generally vertical cross sectional detail taken on an enlarged scale at line 3—3 of Figure 1.
Figure 4:
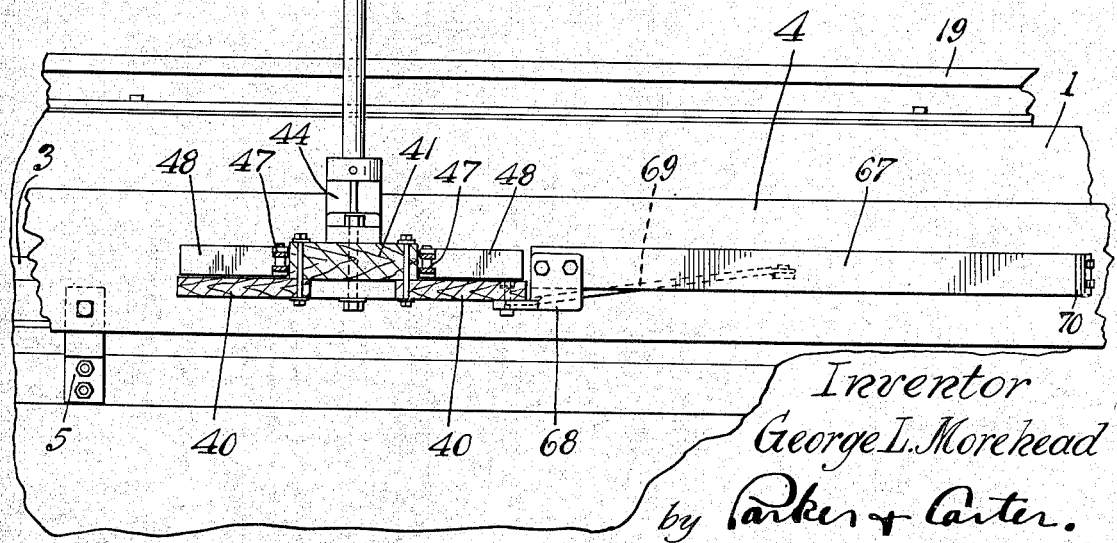
Figure 4 is a generally vertical cross sectional detail on an enlarged scale, taken at line 4—4 of Figure 1.

In the form here shown in Figures 1 and 2 in general and in detail in Figures 3 and 4, the scum conveyor floats upon the liquid. The conveyor comprises two wooden or other buoyant members 40, and a third intermediate buoyant member 41. An idler sprocket 42 is carried at one end of the scum conveyor upon take-up bearings 43. At the opposite end is positioned a bearing 44 within which a shaft 45 is journaled. This shaft carries at its lower end a driving sprocket 46. A chain 47 engages the sprockets 41 and 46 and carries outwardly extending flights 48.

To the outer or free end of the shaft 32 is attached a universal joint 49 through which a short shaft 50 is driven. This shaft carries a beveled gear 51 which meshes with a second beveled gear 52 on the shaft 45. The beveled gears 51 and 52 and the shaft 50 are furnished bearing and held in position by a yoke 53. Through the gearing just described rotation of the shaft 32 drives the sprocket 46 and thus drives the chain and the skimmer flights. If necessary to increase or adjust the buoyancy of the floating skimmer, one or more floats 54 may be provided.

The floating skimmer conveys the scum which collects at the surface of the liquid in the tank toward the scum baffle 4. The collected scum may be removed from the tank in any desired manner and by any desired mechanism. No particular mechanism is here shown for removing the collected scum from the tank. This may be done by hand or by any suitable mechanism, automatic or otherwise. No such mechanism is illustrated herewith because its details form no part of the present invention, which is concerned with the sludge and scum collecting and conveying mechanism but is not concerned with the details of the final scum removal from the tank after its collection.

To assist in moving scum to the point of removal and to assist in collecting it, a guide or sweep 67 is supported at one end as at 68 upon the floating skimmer and is supported elsewhere upon an arm 69 attached to the skimmer. It carries at its outer end a wiping portion 70 which may be of rubber or other yielding material and which contacts the scum baffle 4.

To assist in moving the scum gathered by the flights and collecting it in a pocket formed by the sweep 67 and baffle 4, a water or air spray means may be provided. This means comprises a spray pipe 71, carried on a support 72 from the bridge 17. Water when used is supplied to the pipe 73 from a pump 74 which has an intake pipe 75 extending downwardly into the liquid within the tank. A motor 76 may be provided to drive the pump or the pump may be driven from the motor 35 by additional gearing.

The floating skimmer is towed about the tank by the bridge assembly, as it moves. The driving means for this is the chain 47 of the floating skimmer which constitutes a connection between the skimmer float and the bridge. Thus the shaft 32, universal joint 49, the shaft 50, yoke 53 and shaft 45 comprise a connection between the float and the bridge so that as the bridge moves the float is carried with it. To prevent swinging and misalignment of the float with respect to the bridge and with respect to the tank, a stop 77 is positioned on the bridge and extends upwardly into the position normally occupied by the floating skimmer when the tank is full. This position is shown in Figure 2. A chain 78 removably joins the float to the bridge at a point adjacent the stop 77. By means of the chain and the stop the float is thus attached to the bridge at a point separate from the transmission above described and swinging and misalignment is prevented. If the tank is to be emptied ordinarily the chain 78 will be detached from the stop 77. The upper end of the shaft 45, see Figures 3 and 4, is squared as at 79 and the beveled gear 52 slides over the squared portion of the shaft and is carried in the yoke 53 and is held in it by a collar 80 and a set screw 81. The fit of the squared portion 79 within the squared perforation in the beveled gear 52 is free enough so that as liquid is withdrawn from the tank and the floating skimmer assembly thus sinks, the portion 79 of the shaft 45 merely slips out of engagement with the beveled gear 52 and the skimmer assembly thus automatically disconnects itself from its drive and floats downward with the liquid. When the tank is refilled the assembly floats up again on the liquid surface and is guided by the operator so that the portion 79 of the shaft 45 again enters the squared perforation in the beveled gear 52 and the parts are again in position to be driven. The chain 78 is again reattached and the parts are in position shown in Figures 1 and 2 and ready for operation. If for any reason it is desired to have the gear 52 attached to the shaft 45 so that the two do not readily pull apart, then some part of the transmission, for example the universal joint 49, will be detached and then as the liquid is discharged from the tank the floating skimmer assembly merely floats downward with the liquid and rests upon the bottom if the tank is completely emptied. When the tank is refilled, the skimmer floats upward until it reaches the position generally indicated in Figure 2 and in that position the universal joint and the chain are again connected and the complete assembly is in position for use.

The use and operation of the invention are as follows:

In the form of the invention illustrated, the liquid to be treated with whatever solids it may carry is introduced into the tank through the member 7. Ordinarily some solids within the body of liquid will settle toward the bottom of the tank and some scum which may be composed of light solids or a mixture of solids and gases which cause them to float accumulates at or near the upper surface of the liquid. In order to collect the material at the bottom of the tank for withdrawal from the tank, the conveying assembly comprising the frame 14, the bridge 17 and the driving and conveying parts which they carry, is driven around the tank by the engagement of the chain 37 with the pocketed wheel 36. The movement of the assembly about the tank is ordinarily very slow.

As the assembly moves about the tank the plow 20 moves the material at and near the bottom of the tank ahead of it, the assembly moving in the direction of the full arrow in Figure 1. At the same time the conveyor made up of the chains 25 and the flights 26 is driven, moving in the direction of the arrow in Figure 2, and thus moves material toward the sludge trough 9. Thus the bottom of the tank is swept by the plow 20 and the material thus swept up and engaged by flights of the conveyor 26 is moved toward and discharged into the sludge hopper from which it is removed through the connection 10.

In the form of the invention shown, the conveyor assembly just described has joined to it a skimmer which floats on the surface of the liquid; parts of it, of course, project slightly below the surface and thus the flights 48 on the chain 47 of the floating skimmer which are partially above and partially below the surface of the liquid pick up and carry the scum which they encounter. The skimming conveyor moves in the direction of the broken arrow in Figure 1 and thus moves the scum toward the scum baffle 4. By this means the scum is removed from the surface of the liquid within the tank and caused to collect at or near the scum baffle.

As the entire assembly moves about the tank this gathered scum is collected, retained and carried along partly by the floating skimmer and partly by the member 67 carrying the wiper 70. The scum so collected and retained may be discharged into a scum trough of any desired type, not here shown, or it may be discharged by hand, for example, by being dipped out. The conveyor 47 with flights 48 assists in moving or driving the scum toward the scum baffle 4 and the member 67 assists further. The spray of water or air from the spray pipe 71 carried by the floating skimmer also assists in washing the scum free from the flights and toward the scum baffle. There is thus formed between the scum baffle 4 and the collecting member 67 a scum trap or retaining pocket into which the scum is moved or forced, and within which it is collected and retained until it is removed by any desired means.

Whatever the form of the invention, in general the result is to provide means, namely, the scum baffle 4, for preventing scum from flowing into the overflow trough 2, and to provide additional means, first for removing the scum from the surface of the liquid, and for collecting it, which means may comprise the moving conveyor 47, 48 and the member 67. The scum is thus removed from the entire surface of the liquid; is collected, retained and finally discharged into a scum trough or otherwise removed from the tank.

I claim:

1. In combination with a tank adapted to receive liquid, means for removing scum from the surface of the liquid within the tank, said means comprising a skimming mechanism and an elongated floating means therefor to support the same by flotation in the liquid, said skimming mechanism including a conveyor adapted to move longitudinally in front of the floating means and in general parallelism with the longitudinal axis thereof.

2. In combination with a tank adapted to receive liquid, means for removing scum from the surface of the liquid within the tank, said means comprising a skimming mechanism and an elongated floating means therefor to support the same by flotation in the liquid, said skimming mechanism including a scum sweeping part and a conveyor adapted to move longitudinally in front of the floating means and in general parallelism with the longitudinal axis thereof.

3. In combination with a tank adapted to receive liquid, means for removing scum from the surface of the liquid within the tank, said means comprising a skimming mechanism and an elongated floating means therefor to support the same by flotation in the liquid, said skimming mechanism including an extended scum sweeping part and a conveyor and means for driving the scum engaging portion of the conveyor longitudinally in front of the floating means along a line generally parallel with the longitudinal axis thereof in a direction toward the circumference of the tank.

4. In combination with a unitary circular tank, means for introducing liquid to it and means, including a skimmer, for removing scum and solids from the upper surface of the liquid within the tank, a second floor-sweeping means for collecting solids from the bottom of the body of liquid within the tank, and a third means for removing settled solids from the floor of the tank, and a conveying carrier, said several means mounted upon said conveying carrier, and means for revolving said conveying carrier about the tank, said carrier carrying near the floor of the tank a plow, a scum conveyor carrier by the conveying carrier adjacent the top surface of the liquid, and means for moving the scum conveyor in a direction transverse to the line of movement of the conveying carrier as a whole, a fixed discharge in the bottom of the tank receiving material from the floor sweeping conveyor means, said scum conveyor moving means being adapted to move said conveyor generally continuously with respect to its support.

5. In combination with a tank, means for introducing liquid to it and means for removing solids from the upper and lower surfaces of the body of liquid within the tank, said means comprising a conveying carrier mounted within the tank, and means for moving said conveying carrier about the tank, said carrier carrying a plow and a sludge conveyor mounted to move along the floor of the tank, a generally continually moving scum conveyor adjacent the upper surface of the liquid, said scum conveyor comprising chains, flights and means for driving the chains, and adapted to move material floating at the upper surface of the liquid toward the periphery of the tank, a fixed discharge in the bottom of the tank receiving material from the floor sweeping conveyor carrier, the two conveyors being both of them movable with respect to the conveying carrier and means for moving them in a direction transverse to the line of movement of the carrier itself.

6. In combination with a tank, means for introducing sewage and liquid waste to it and means for removing solids from the upper and lower surfaces of the body of liquid within the tank, said means comprising a conveyor carrier mounted within the tank, and means for moving said conveyor carrier about the tank, said carrier carrying adjacent its bottom a conveying plow and a generally continuously moving power driven sludge conveyor, a generally continuously moving power driven conveyor adjacent the surface of the liquid, said conveyor comprising chains, flights and means for driving the chains, a fixed discharge in the bottom of the tank receiving material from said first mentioned conveyor, and a float carrying said moving conveyor adjacent the surface of the liquid, said means for driving said chains, comprising means for moving the conveyor laterally with respect to the movement of the conveyor carrier to propel scum to a concentration point.

7. In combination with a tank, means for introducing sewage and liquid waste to it and means for removing solids from the upper and lower surfaces of the body of liquid within the tank, said means comprising a conveying carrier mounted within the tank, and means for moving said conveying carrier about the tank, said carrier carrying adjacent its bottom a plow, and a moving sludge conveyor mounted on the carrier to move along the bottom of the tank, a generally continuously moving scum conveyor adjacent the surface of the liquid carried by the conveying carrier, and provided with a positive power means whereby it is driven independent of the movement of the conveying carrier to move material toward the periphery of the tank for discharge at the edge of the tank, a fixed discharge in the bottom of the tank receiving material from said first mentioned conveyor, and a float carrying said scum conveyor adjacent the surface of the liquid.

8. In combination with a tank, means for introducing sewage and liquid waste to it and means for removing solids from the upper and lower surfaces of the body of liquid within the tank, said means comprising a conveying assembly mounted within the tank, and means for moving said conveying assembly about the tank, said assembly carrying adjacent its bottom a plow, and a moving sludge conveyor mounted on the assembly to move along the bottom of the tank, a generally continuously moving scum conveyor adjacent the surface of the liquid carried by the conveying assembly and provided with a positive power means whereby it is driven independent of the movement of the conveying assembly to move material toward the periphery of the tank for discharge at the edge of the tank, and unitary means for driving both of said conveyors, a fixed discharge in the bottom of the tank receiving material from said first mentioned conveyor, and a float carrying said scum conveyor adjacent the surface of the liquid.

9. In combination with a tank, means for introducing sewage and liquid waste to it and means for removing solids from the upper and lower surfaces of the body of liquid within the tank, said means comprising a conveying assembly mounted within the tank, and means for moving said conveying assembly about the tank, said assembly carrying adjacent its bottom a plow, and a moving sludge conveyor mounted on the assembly to move along the bottom of the tank to convey material away from its periphery, a generally continuously moving scum conveyor adjacent the surface of the liquid carried by the conveying assembly and provided with a positive power means whereby it is driven independent of the movement of the conveying assembly in a direction to move material toward the periphery of the tank for discharge at the edge of the tank, and unitary means for driving both of said conveyors, a fixed discharge in the bottom of the tank receiving material from said first mentioned conveyor.

10. In combination with a tank, means for introducing sewage and liquid waste to it and means for removing solids from the upper and lower surfaces of the body of liquid within the tank, said means comprising a conveying carrier mounted within the tank, and means for moving said conveying carrier about the tank, said carrier including a moving scum collector adjacent the surface of the liquid, said scum collector including an elongated member floating upon the liquid and attached to the conveying carrier for movement with it, and a flight conveyor mounted upon said floating member for longitudinal movement with respect thereto in a direction generally transverse to the line of movement of the float, and means for driving said flight conveyor.

11. In combination with a tank, means for introducing sewage and liquid waste to it and means for removing solids from the upper and lower surfaces of the body of liquid within the tank, said means comprising a conveying carrier mounted within the tank, and means for moving said conveying carrier about the tank, said carrier adjacent its bottom carrying a plow and a moving conveyor driven to move along the bottom of the tank, and a surface scum conveyor comprising an elongated member floating upon the liquid and attached to the carrier for movement with it, and unitary means for driving both of said conveyors, a fixed discharge in the bottom of the tank receiving material from said first mentioned bottom conveyor, the scum conveyor comprising chains and flights and being mounted for movement along a line generally parallel with the longitudinal axis of the floating member and across the line of movement of such member, and means for driving it.

12. In combination with a tank, means for introducing sewage and liquid waste to it and means for removing solids from the upper and lower surfaces of the body of liquid within the tank, said means comprising a conveying assembly mounted within the tank, and means for moving said conveying assembly about the tank, said assembly including adjacent its bottom a plow, and a moving conveyor and means to drive it to move along the bottom of the tank to convey material towards the tank center, and a scum conveyor mounted adjacent the surface of the liquid for movement with respect to said assembly, and means to drive it continuously to move material on or near the surface of the liquid toward the periphery of the tank for discharge at the edge of the tank, said scum conveyor including also a member floating upon the liquid and attached to the assembly for movement with it, the scum conveyor being mounted upon the floating member, and a fixed discharge in the bottom of the tank receiving material from said first mentioned conveyor.

13. In combination with a tank, means for introducing sewage and liquid waste to it and means for removing solids from the upper and lower surfaces of the body of liquid within the tank, said means comprising a conveying assembly mounted within the tank, and means for moving said conveying assembly about the tank, said assembly including adjacent its bottom a plow, and a moving conveyor and means to drive it to move along the bottom of the tank to convey material towards the tank center, and a scum conveyor mounted adjacent the surface of the liquid for movement with respect to said assembly, and means to drive it continuously to move material on or near the surface of the liquid toward the periphery of the tank for discharge at the edge of the tank, said scum conveyor including a member floating upon the liquid and attached to the assembly for movement with it, the scum conveyor being mounted upon the floating member and a unitary actuating means for driving both of said conveyors, a fixed discharge in the bottom of the tank receiving material from said first mentioned conveyor, and a flexible driving connection between the unitary driving means and the scum conveyor whereby the conveyor is driven by such driving means irrespective of its position with relation to the conveying assembly.

14. In combination, a sedimentation tank having influent and effluent apertures and a sludge hopper, means for collecting settled sludge and discharging it into the sludge hopper, a frame projecting upwardly from the sludge collecting means above the surface of the liquid in the tank, drive means thereon adapted to propel said frame and the sludge collecting means along the tank floor, a float on the surface of the liquid within the tank, a connection between said float and the frame whereby the float moves with the frame, a scum conveyor on the float and means for driving said conveyor irrespective of movement of said frame, said means including a driving connection between it and the driving means on the frame whereby the scum conveyor independent of the movement of the float propels scum laterally and concentrates it adjacent one end of the float.

15. In combination, a sedimentation tank having influent and effluent apertures and a sludge hopper, means for collecting settled sludge and discharging it into the sludge hopper, a frame projecting upwardly from the sludge collecting means above the surface of the liquid in the tank, drive means thereon adapted to propel said frame and the sludge collecting means along the tank floor, a float on the surface of the liquid within the tank, a connection between said float and the frame whereby the float moves with the frame, a scum conveyor on the float and means for driving said conveyor irrespective of movement of said frame, said means including a driving connection between it and the driving means on the frame whereby the scum conveyor independent of the movement of the float propels scum laterally and concentrates it adjacent one end of the float, and a conveyor forming part of the sludge collecting means and means for moving it to propel sludge in a direction opposite to the direction of propulsion of the scum.

16. In combination, a sedimentation tank having influent and effluent apertures and a sludge hopper, means for collecting settled sludge and discharging it into the sludge hopper, a frame projecting upwardly from the sludge collecting means above the surface of the liquid in the tank, drive means thereon adapted to propel said frame and the sludge collecting means along the tank floor, a float on the surface of the liquid within the tank, a connection between said float and the frame whereby the float moves with the frame, a scum conveyor on the float and means for driving said conveyor irrespective of the movement of said frame, said means including a driving connection between it and the driving means on the frame whereby the scum conveyor independent of the movement of the float propels scum laterally and concentrates it adjacent one end of the float, the connections between the float and the frame and between the drive means and the scum conveyor being flexible to permit operation irrespective of minor changes of relative positions of the parts and releasable to permit release when the liquid level in the tank permits the float to settle toward the bottom.

GEORGE L. MOREHEAD.